United States Patent
Lin et al.

[11] Patent Number: 6,119,401
[45] Date of Patent: Sep. 19, 2000

[54] DUAL-SLIDER WINDOW REGULATOR WITH THREE FLEXIBLE, INEXTENSIBLE DRIVE MEMBERS

[75] Inventors: Jih-Cheng Lin, Farmington Hills; Osamu Hamaguchi, Troy, both of Mich.

[73] Assignee: Hi-Lex Corporation, Battle Creek, Mich.

[21] Appl. No.: 09/126,649

[22] Filed: Jul. 31, 1998

[51] Int. Cl.[7] .............................. E05D 15/06; E05F 17/00
[52] U.S. Cl. .................................. 49/361; 49/123; 49/118; 49/413
[58] Field of Search .......................... 49/380, 361, 116, 49/123, 118, 413, 360, 352

[56] References Cited

U.S. PATENT DOCUMENTS

| | | | |
|---|---|---|---|
| 358,089 | 2/1887 | Tierney | 49/123 |
| 542,069 | 7/1895 | Tackaberry | 49/123 |
| 1,966,182 | 7/1934 | McCormick | 49/123 |
| 2,235,381 | 3/1941 | McCormick | 187/319 |
| 4,503,637 | 3/1985 | Parente | 49/141 |
| 4,730,414 | 3/1988 | Nakamura et al. | 49/348 |
| 4,785,582 | 11/1988 | Tokue et al. | 49/211 |
| 4,890,376 | 1/1990 | Boileau | 29/434 |
| 4,920,698 | 5/1990 | Friese et al. | |
| 4,995,195 | 2/1991 | Olberding et al. | |
| 5,113,620 | 5/1992 | Laux et al. | 49/361 |
| 5,146,712 | 9/1992 | Hlavaty | |
| 5,531,046 | 7/1996 | Kollar et al. | |
| 5,613,323 | 3/1997 | Buening | |
| 5,669,181 | 9/1997 | Kollar et al. | 49/360 |
| 5,711,112 | 1/1998 | Barten et al. | 49/118 |
| 5,724,769 | 3/1998 | Cripe et al. | |
| 5,775,029 | 7/1998 | Buening | 49/360 |
| 5,784,833 | 7/1998 | Sponable et al. | |
| 5,819,878 | 10/1998 | Barrett et al. | 187/324 |
| 5,822,922 | 10/1998 | Grumm et al. | 49/360 |
| 5,836,110 | 11/1998 | Buening | 49/360 |
| 6,021,605 | 2/2000 | Laux et al. | 49/361 |

*Primary Examiner*—Daniel P. Stodola
*Assistant Examiner*—Gregory J. Strimbu
*Attorney, Agent, or Firm*—Young & Basile, P.C.

[57] ABSTRACT

A window regulator for moving a pair of slidable window panes toward and away from one another utilizes three flexible, inextensible members such as cables to achieve a pull open/pull closed mode of operation of the slidable panes. First and second of the flexible members are attached to respective first and second pane carriers and to a drive drum, and the third flexible member connects the first and second pane carriers. The first and third flexible members are routed around pulleys located at outboard ends of a guide rail along which the pane carriers travel such that rotation of the drive drum in one direction pulls the panes toward an open position, and rotation of the drum in the opposite direction pulls the panes toward a closed position. The first and second pane carriers engage the respective first and second panes by mating engagement between male and female members to achieve a connection which restrains the panes against tipping and binding as they slide along their guide tracks, yet allows relative movement between the pane carriers and the panes along an axis substantially perpendicular to the panes. This type of connection avoids binding or jamming of the panes during sliding movement and simplifies the assembly process.

17 Claims, 4 Drawing Sheets

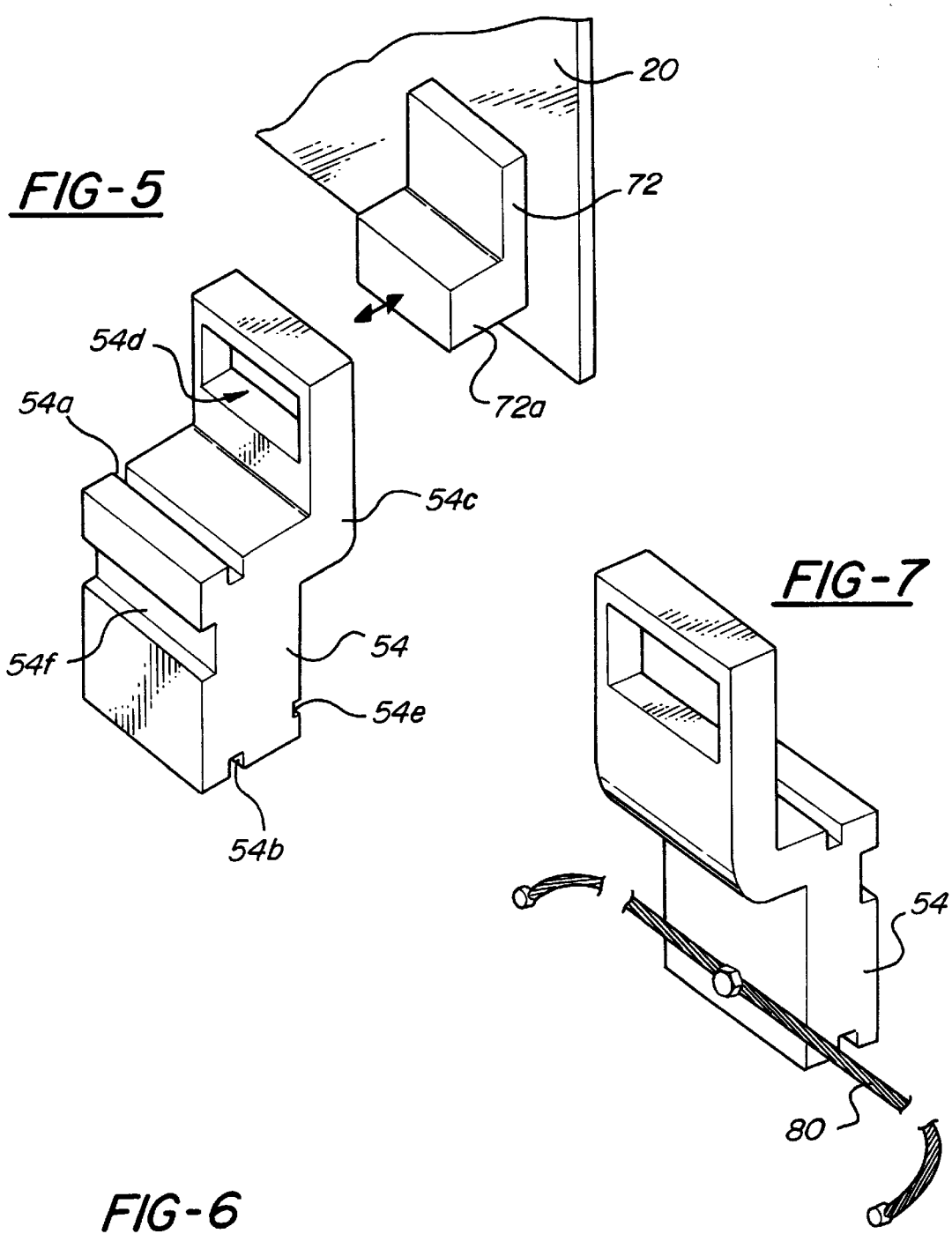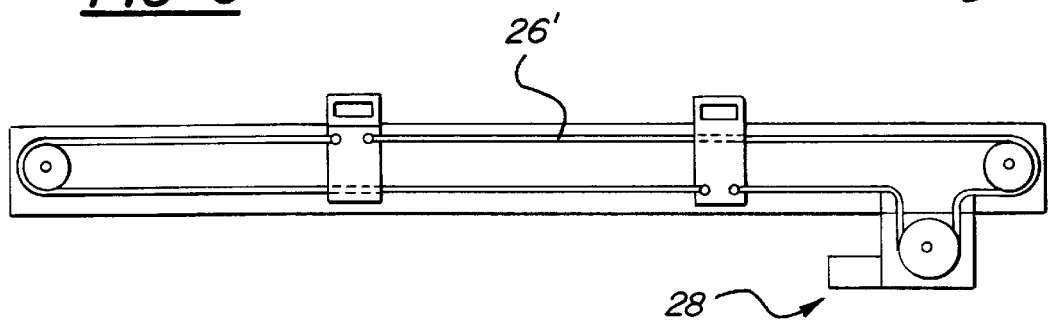

DUAL-SLIDER WINDOW REGULATOR WITH THREE FLEXIBLE, INEXTENSIBLE DRIVE MEMBERS

FIELD OF THE INVENTION

This invention relates to sliding window assemblies for motor vehicles and more specifically to a powered window regulator for opening and closing sliding window panes.

BACKGROUND OF THE INVENTION

It is known to fit the rear window opening of a truck cab with a sliding window assembly made up of a pair of stationary window panes mounted outboard in a window opening to define an gap therebetween, and one or two window panes retained along their upper and lower edges in guide tracks for horizontal sliding movement. In an assembly having two sliding panes, the panes slide toward one another to close the gap between the stationary panes and slide in opposite directions away from one another to an open position in which they overlap the stationary panes.

Many different power window regulator mechanisms have been proposed to allow an occupant of the truck to open and close the sliding window by actuating a switch. These prior art regulator mechanisms usually employ a reversible electric motor to drive a cable, slotted tape, or a rack-and-pinion mechanism to move the slidable panes between the open and closed positions. The regulator mechanisms of the prior art are typically integrated in some fashion with the window frame which surrounds the window assembly and/or with the guide tracks in which the sliding panes are retained. As a result, the window panes, frame and the guide rails must be specially designed to incorporate the regulator system. Consequently, a window assembly designed to be compatible with a powered regulator is substantially different from an non-powered, manually operated sliding window. This lack of commonality between the powered and manual systems complicates the manufacturing and supply situation for a truck manufacturer wishing to offer both options on a particular type of vehicle.

Regulators utilizing a cable or slotted tape drive system have been proposed for window assemblies featuring a single sliding pane. See, for example, U.S. Pat. No. 5,784,833 and U.S. Pat. No. 4,920,698. For systems having two sliding panes, however, more complicated drive mechanisms have been found to be necessary, such as threaded shafts (U.S. Pat. No. 4,995,195) or a combination of a rack-and-pinion and slotted tape mechanism (U.S. Pat. No. 5,146,712).

An objective of some regulators is to achieve a pull/pull effect, where the cable (or other flexible, inextensible member) is routed so as to apply a pulling force to the sliding pane to move it toward its open position, and an oppositely directed pulling force to move the pane toward its closed position. Such a pull/pull drive configuration allows the cables to be constructed to less exacting dimensional tolerances with a resulting reduction in cost, and also greatly eliminates friction due to binding of the cables and the sliding pane that would be present if a pushing force were applied, thereby allowing the use of a substantially smaller, less powerful and less expensive motor.

The prior art power sliding window regulators have also generally required a relatively high degree of dimensional accuracy in the interface between the window assembly and the regulator. This is a consequence of the drive components of the regulator mechanism being integrated with the window frame and/or guide rails for the sliding panes. A relatively new type of automotive vehicle window assembly, known as a "frameless" assembly, has been proposed. In this frameless window assembly, the fixed window panes are installed directly into the window opening to provide a more simple and clean appearance. Since there is no rigid frame surrounding the window panes, the dimensional accuracy and "flatness" of such an assembly depends upon the construction of the vehicle structure surrounding the window opening. Because of normal manufacturing tolerances, the surrounding structure is likely to be less dimensionally precise than a traditional, separately fabricated window frame.

SUMMARY OF THE INVENTION

It is an objective of this invention to provide a vehicle window regulator wherein the efficiency, simplicity and ease of manufacture of a pull-open/pull-closed drive system is adapted for use with a window assembly featuring two movable window panes which slide in opposite directions.

It is the further objective of this invention to provide a power-driven window regulator assembly fabricated as a separate, essentially self-contained unit which may be attached to a window assembly that is nearly identical to a window assembly intended for manual operation. This allows a single window assembly to be utilized for both manual and power applications and simplifies the construction of the window assembly.

It is another objective of this invention to provide a sliding window regulator that minimizes the tendency of a sliding pane to tip and so bind in its guide tracks as it is slid therealong by he regulator.

It is yet another objective of this invention to provide a sliding window regulator that avoids binding when used with a window assembly having relatively poor dimensional precision.

These objectives are achieved in the present invention by a window regulator wherein first and second flexible, inextensible members such as cables are attached to respective first and second pane carriers and to a drive drum, and a third flexible, inextensible member connects the first and second pane carriers. The first and third flexible members are routed around pulleys located at outboard ends of a guide rail along which the pane carriers travel such that rotation of the drive drum in one direction pulls on the first flexible member to move the first pane carrier toward an open position, and this movement places the third flexible member in tension to pull the second pane carrier toward the open position. In a similar fashion, rotation of the drum in the opposite direction pulls the second flexible member to move the pane carrier toward a closed position and this movement places the third flexible member in tension to pull the first pane carrier toward the closed position. This configuration wherein the third flexible member connects the two pane carriers results in a simple-to-manufacture, compact and efficient vehicle window regulator.

The three flexible members, rather than being separate lengths of flexible member attached at either end to the drum and pane carriers, may alternatively be segments of a single, continuous length of flexible member attached to the drum at it ends and having the two pane carriers attached thereto at intermediate location to subdivide it into the three described segments.

According to another aspect of the invention, the pane carriers engage their respective panes by means of a sliding male/female connection which restrains the panes against tipping and binding within their guide tracks as they are slid therealong by the regulator, yet allows relative movement between the pane carriers and the panes along an axis substantially perpendicular to the pane. This type of connection allows the regulator to operate properly, without binding or jamming, when attached to a window assembly that is not perfectly flat along the direction of sliding movement. It also simplifies the assembly process, since the regulator does not have to be attached to the window assembly with a great deal of precision.

BRIEF DESCRIPTION OF THE DRAWING

FIG. 5 is an exploded view perspective view showing the engagement between a carrier block and an attachment block according to the present invention;

FIG. 6 is a front view of an alternative version of the invention window regulator, with the drive unit integrated with the housing; and FIG. 7 is a perspective view of an alternative method of attaching a carrier block to a cable.

DETAILED DESCRIPTION OF THE PREFERRED EMBODIMENT

Figure 1:
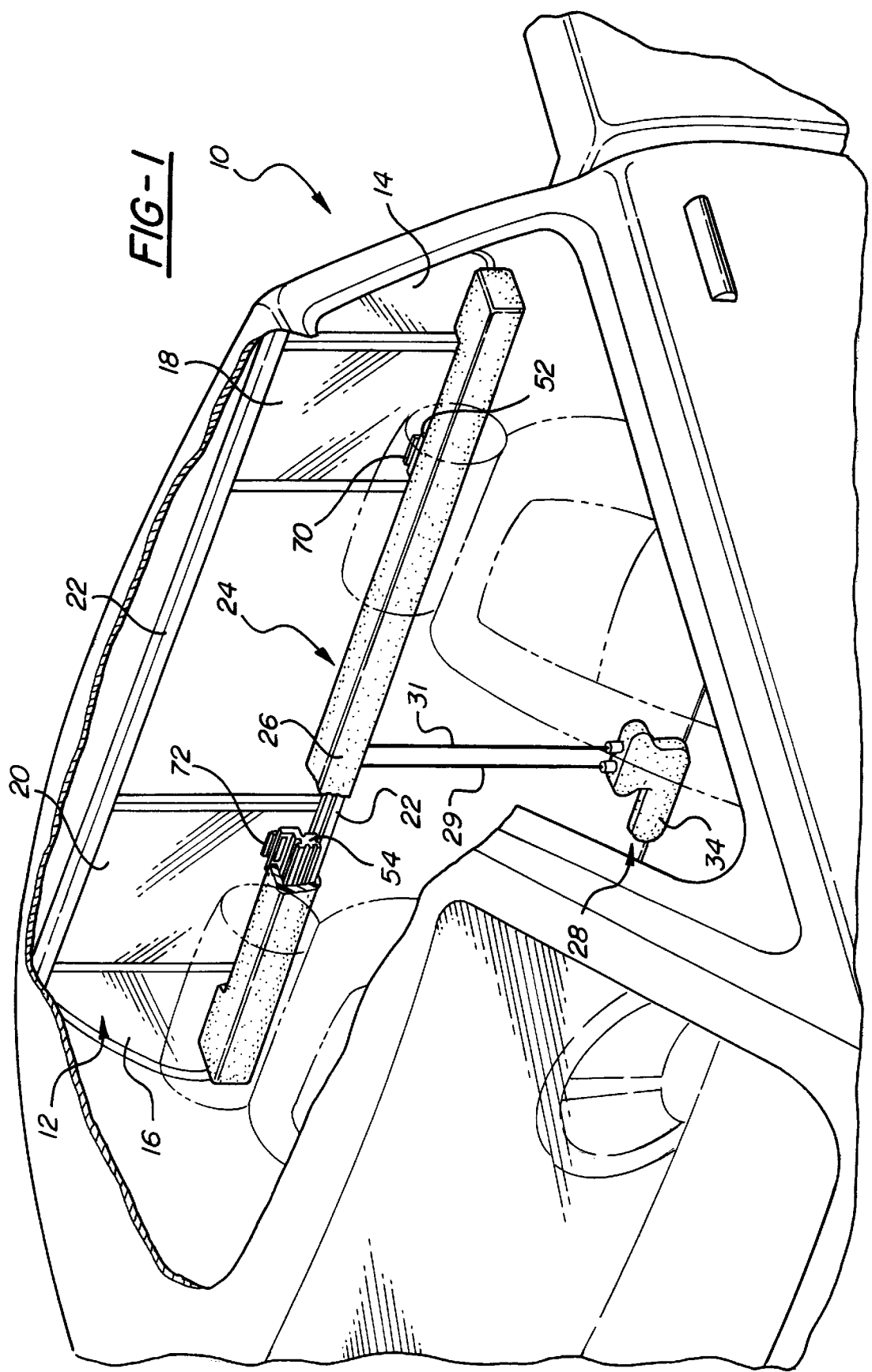
FIG. 1 is a perspective view of a vehicle having a sliding window assembly operated by a power regulator according to the present invention.

Referring to FIG. 1, a truck cab 10 is fitted with a window assembly 12 including first and second fixed panes 14,16 located at opposite ends of a window opening, and first and second sliding panes 18,20 mounted in guide tracks 22 extending across the top and bottom of the window opening.

A window regulator 24 according to the present invention comprises an elongated housing 26 which is attached to the window assembly 12 adjacent the lower edge thereof on the interior of the truck cab 10, and a drive unit 28 mounted within the cab 10 at a location remote from the window assembly 12 and connected with the housing by two Bowden-type conduits 29, 31. The window regulator 24 is preferably secured at its outboard ends directly to the inner surface of the fixed panes 14,16 by, for example, an adhesive. As an alternative, the housing 26 may be attached to the cab structure surrounding the window opening below and/or outboard of the fixed panes 14,16.

Referring now to FIGS. 2–5, the central portion of regulator housing 26 comprises a guide rail 26a in the form of a generally C-shaped channel with ridges 26d,26e projecting from the upper and lower flanges of the channel. Mounting feet 26b,26c are disposed at either end of the housing and close off the open side of the channel. The housing 26 is preferably formed of aluminum or a high strength plastic. For convenience of description, the housing 26 will be referred to herein as having left and right ends as viewed in FIG. 2. Assuming that the regulator 24 is mounted to the surface of the window assembly 12 on the inside of the truck cab 10, these terms will correspond to the left and right sides of the vehicle overall.

The drive unit 28 comprises a reversible electric motor 30 which rotates a drive drum 32 enclosed within a casing 34. The casing 34 is not shown in FIG. 2 in order to expose the internal components. The drive drum 32 has, as is well known in the window regulator art, a spiral cable groove formed around the circumference thereof. The motor 30 is supplied with 12 volt DC electrical power from the vehicle electrical system and is controlled by a three-position switch (not shown) located within the truck cab 10 where it may be easily reached by occupants of the cab.

Left and right pulleys 40,42 are rotatably mounted adjacent the ends of the regulator housing 26 and are partially enclosed by the mounting feet 26b,26c. Left and right cable guide blocks 44,46 are mounted near the center of the guide rail 26a directly above a pair of conduit attachments 48,50 which are secured to and pass through the lower flange of the guide rail. The guide blocks 44,46 are quarter-circular in shape and have grooves (see FIG. 4) formed in the curved guide surfaces thereof. The pulleys 40,42 and cable guide blocks 44,46 are preferably made of a plastic having self-lubricating properties, such as trifloropolyethlene.

A first carrier block 52 is located adjacent the left end of the guide rail 26a. The carrier block 52 has slots 52a,52b extending along the upper and lower edges thereof which engage ridges 26d,26e so that the carrier block 52 is slidingly retained in the guide rail 26a. An engagement member 52c extends from the upper edge of the carrier block, projecting outwardly and upwardly to clear the upper flange of the guide rail 26a. A generally rectangular socket 52d is formed through the upper end of the engagement member. A pair of blind, circular receptacles 52e is formed in the front surface of the carrier block adjacent its upper end, and a channel 52f extends across the rear surface of the carrier block adjacent its lower end.

Figure 4:
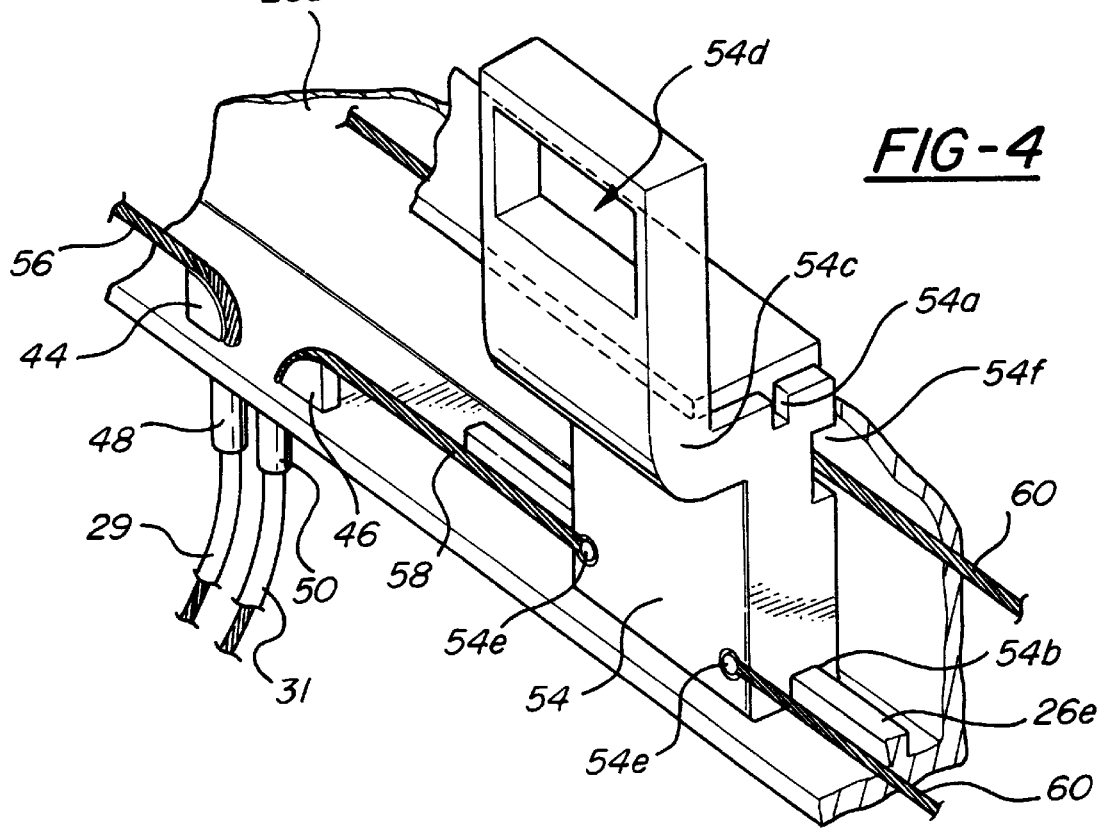
FIG. 4 is a partial perspective view of the interior of the window regulator.

A second carrier block 54 generally similar in configuration to the first carrier block 52 is retained in the right end of guide rail 26a for sliding movement therealong. As best seen in FIGS. 4 and 5, the second carrier block 54 has slots 54a,54b extending along the upper and lower edges thereof, an engagement member 54c extending from the upper edge thereof, and a generally rectangular socket 54d formed through the upper end of the engagement member. The second carrier block differs from the first in that it has a pair of blind, circular receptacles 54e adjacent its lower end, and a channel 54f adjacent its upper end.

Stop blocks 55 are secured to the interior of the guide rail 26a between respective left and right pairs of pulleys and cable guide blocks to limit the sliding movement of the carrier blocks 52,54 along the length of the guide rail.

A first length of steel cable 56 is secured to the first carrier block 52. This may be achieved, for example, by inserting a bead 56a secured to the end of the cable 56 into the appropriate receptacle 52e formed in the carrier block. Cable 56 extends from the carrier block 52 toward the left end of the housing 26 and wraps around the left pulley 40 so that it is directed back toward the center of the housing 26. Cable 56 passes through the lower channel 52f of carrier block 52, around the left cable guide block 44, and downwardly through conduit attachment 48 and through conduit 29 to drive unit 28. Cable 56 wraps in a counterclockwise direction around the drum 32, engaging the spiral groove in the drum, and the end of the cable is secured to the drum.

A second cable 58 is secured to the second carrier block 54 by engaging one of the receptacles 54e and extends toward the center of the housing 26, passing around the right cable guide block 46, then downwardly through the conduit attachment 50 and through conduit 31 to the drive unit 28 where it wraps in a clockwise direction around the drum 32. The second cable 58 engages the spiral groove in the drum 32 and the end of the cable is secured to the drum.

A third length of cable 60 is secured at its first end to first carrier block 52 and extends all the way to the right end of the housing 26, passing through the upper channel 54f of the second carrier block 54. The third cable 60 then passes around right pulley 42 and returns to the second carrier block 54, to which its second end is secured.

The invention regulator may utilize any flexible, inextensible member as an alternative to the cables described and depicted herein. One example of such a member is a slotted plastic tape of the type used in some prior art window regulators. When a slotted tape is used, the drive drum has teeth around its circumference to engage the slots, rather than the cable groove of the disclosed embodiment.

Figure 2:
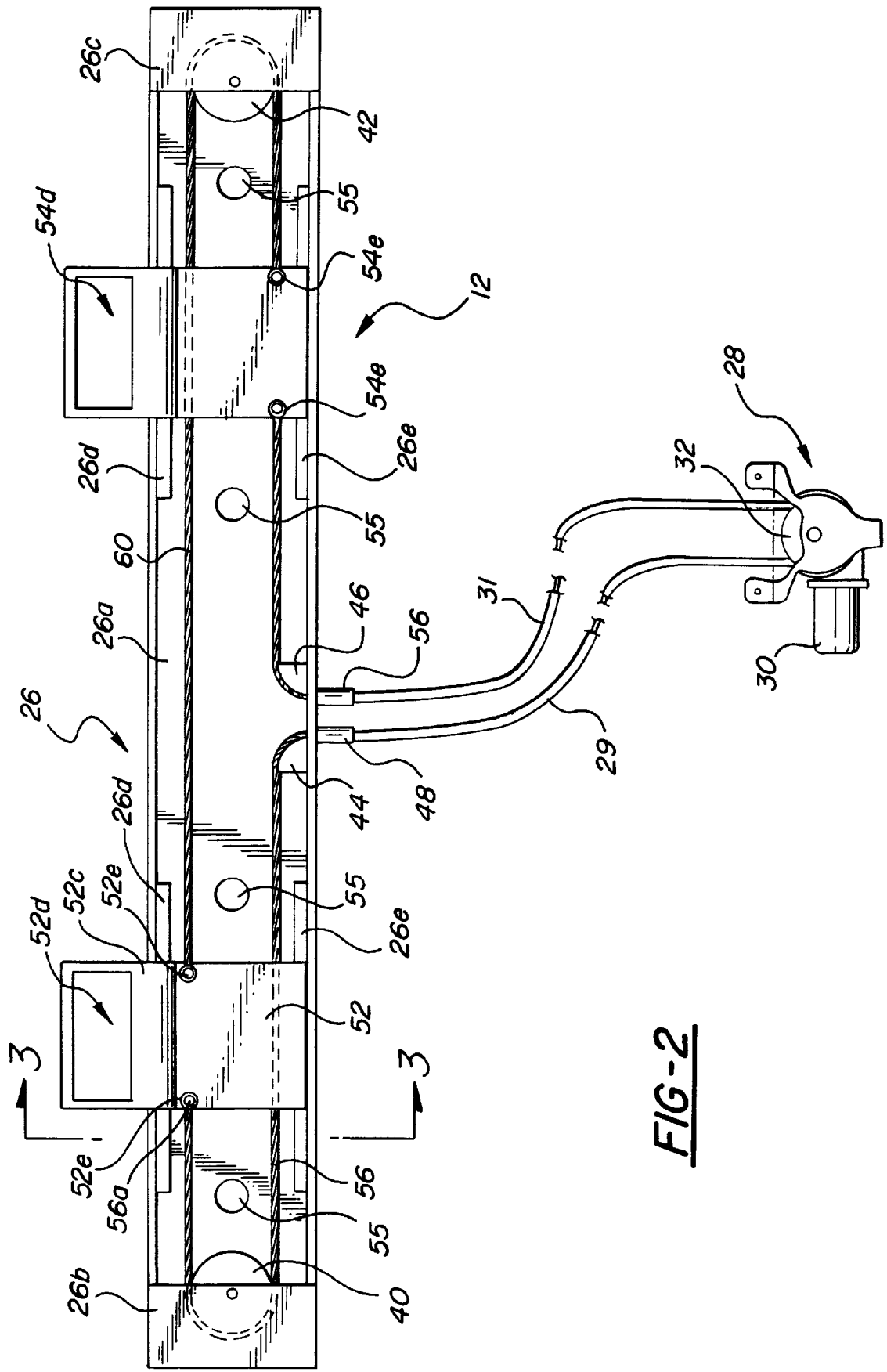
FIG. 2 is a front view of a window regulator according to the present invention.

As is apparent from FIG. 2, rotation of the drive drum 32 in the clockwise direction winds the second cable 58 around the drum, thereby pulling the second carrier block 54 toward the center of the housing 26. As the second carrier block moves in this inboard direction, it places the third cable 60 in tension so that the first carrier block is simultaneously pulled toward the center of the housing 26. For any given amount of rotation of the drum 32, the first and second carrier blocks 52,54 each move an identical distance.

Conversely, rotation of the cable drum 32 in a counterclockwise direction winds the first cable 56 around the drum 32 thereby placing the first cable in tension and, by virtue of pulley 40, pulling the first carrier block 52 toward the left end of the housing 26. As the first carrier block 52 moves in this outboard direction, it places the third cable 60 in tension so that it simultaneously pulls the second carrier block toward the right end of the housing 62. Again, a given amount of rotation of the drum 32 moves the first and second carrier blocks 52,54 identical distances along the guide rail.

Figure 3:
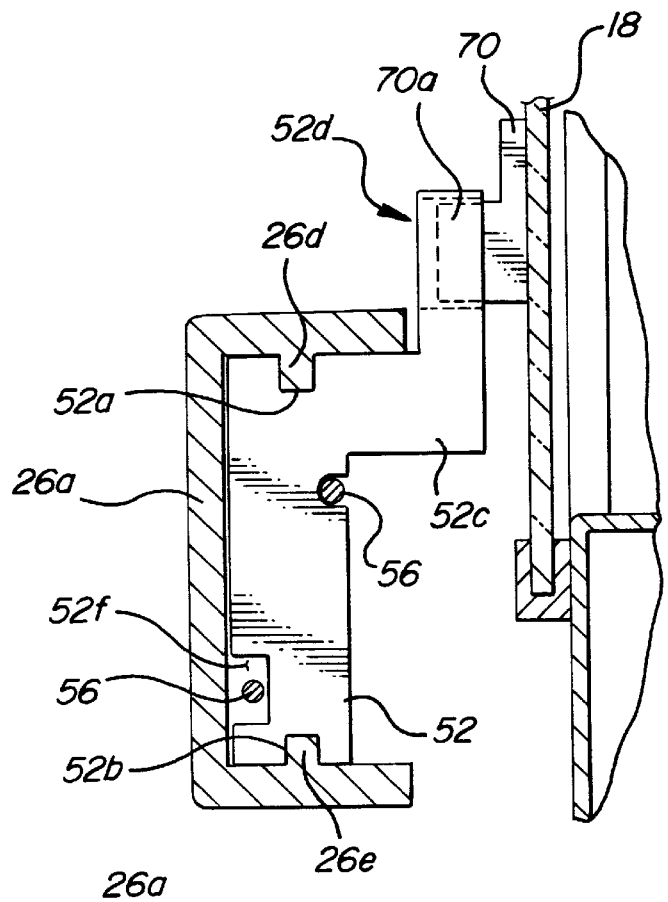
FIG. 3 is a cross-sectional view taken along line 3—3 of FIG. 2.

Referring now to FIGS. 1, 3 and 5, attachment blocks 70,72 are secured to the interior surface of each of the sliding panes 18,20 adjacent their lower edges. In the preferred embodiment of the invention, the attachment blocks are bonded to the sliding panes using an appropriate adhesive. The attachment blocks 70,72 have generally flat glass mating surfaces which may be scored or otherwise textured to provide improved adhesion for the adhesive used to connect the glass attachments to the sliding panes. Rectangular engagement studs 70a,72a extend from the attachment blocks opposite from the glass mating surfaces and project generally perpendicular to the respective glass mating surfaces.

To attach the window regulator 24 to the window assembly 12, the sliding panes 18,20 are slid along their guide tracks 22 to locate the attachment blocks 70,72 at positions matching the positions of the carrier blocks 52,54. A suitable adhesive is applied to the end surfaces of the mounting feet 26b,c and/or to corresponding locations on the fixed panes 14,16 outboard of the guide tracks 22, and the mounting feet are urged into contact with the window assembly 12 such that the engagement studs 70a,72a of the attachment blocks fit into the sockets 52d,54d of their respective carrier blocks.

The engagement studs 70a,72a are sized to fit into their respective sockets 52d,54d with the minimum amount of clearance necessary for manufacturing tolerances while still sliding freely in the direction perpendicular to the plane of the sliding panes 18,20. This allows for in-and-out relative movement between the engagement studs 70a,72a and the sockets 52d,54d while the sliding panes 18,20 are moved along the guide tracks 22 by the regulator 24, thus permitting the regulator to operate smoothly and without binding in spite of a significant degree of unevenness along the lower edge of the window assembly 12 or other dimensional imprecision in the window and regulator assemblies.

The rectangular cross section of the engagement studs and sockets and the closeness of the fit therebetween serves to prevent relative rotation between the studs and sockets. This restrains the sliding panes 18,20 against their tendency to tip within their guide tracks 22 as they are slid therealong by the regulator 24, and so reduces the amount of drag caused by friction between the edges of the panes and the guide tracks. Accordingly, a smaller, less powerful and less expensive motor 30 may be used.

It should be noted that the same advantageous engagement between the pane carrier and the pane attachment can be achieved by forming the female socket on the pane attachment and the projecting stud on the pane carrier. Such a reversal of the position of the elements is within the scope of the present invention.

This advantageous male/female engagement between the pane carrier and the pane attachment is usable with a sliding window assembly which is not perfectly planar, but rather in which the panes follow a curved path as they slide between their open and closed positions. In this case, the regulator housing must have a curvature matching that of the window guide tracks.

The routing and connections of the three cables 56,58,60 as described above results in a drive system in which cable tension is used to move the sliding panes to their open positions as well as to their closed positions. This pull-open/pull-closed operation has been shown to be a superior method of actuating a sliding window when compared with systems which require the driving linear actuator to be in compression to move the pane one direction.

Except for the addition of the attachment blocks 70,72 to the sliding panes 18,20, a manually operated window assembly 12 requires no modification in order to adapt it to accept the regulator 24.

If desired, a regulator according to the present invention may be fabricated with the drive unit 28 attached directly to or integrated with the housing, thus dispensing with the need for Bowden cables to connect the drive unit to the housing. FIG. 6 depicts the drive unit 28 positioned adjacent one end of the housing 26', but the drive unit may be located nearly anywhere along the length of the housing. Such a configuration may be desirable if installation constraints do not require the drive unit 28 to be located remote from the housing.

The invention regulator may also be fabricated using the remotely locatable drive unit connected with the housing by Bowden cables, but with the Bowden cables extending from the housing at a location other than at the center of the housing. For example, the conduit attachments may be located adjacent the right end of the housing, at the general position of the drive unit shown in FIG. 6.

Rather than using three separate cables 56,58,60 to connect the carrier blocks to the drive drum, the invention may also be practiced by combining two or three of the cables into a single length. For example, as seen in FIG. 7, a single length of cable 80 may be used in place of cables 58 and 60, the cable 80 being bolted or otherwise attached to the carrier block 54 to leave the proper lengths of cable extending from the carrier block in both directions.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A window regulator for use with a vehicle window assembly having first and second panes slidable toward one another to a closed position and away from one another to an open position, the regulator comprising:

an elongated guide rail having first and second ends;

first and second pane carriers slidingly movable along the guide rail and engageable with the first and second panes respectively;

a drive drum;

means for rotating the drive drum;

a first flexible, inextensible member having a first end attached to the first pane carrier, extending from the first pane carrier toward and passing around a first guide element disposed adjacent the first end of the guide rail, and having a second end engaged with the drive drum;

a second flexible, inextensible member having a first end attached to the second pane carrier and a second end engaged with the drive drum; and a third flexible, inextensible member having a first end attached to the first pane carrier, extending from the first pane carrier toward and passing around a second guide element disposed adjacent the second end of the guide rail, and having a second end attached to the second pane carrier;

whereby rotation of the drive drum in a first direction pulls on the first inextensible member to move the first pane carrier toward the first end of the guide rail and said movement of the first pane carrier pulls on the third inextensible member to move the second pane carrier toward the second end of the guide rail, and rotation of the drive drum in a second direction opposite the first direction pulls on the first end of the second inextensible member to move the second pane carrier toward the first end of the guide rail which causes the second pane carrier to pull on the third inextensible member to move the first pane carrier toward the second end of the guide rail.

2. The window regulator according to claim 1 wherein the first and second ends of the guide rail have respective attachment feet for attachment to surfaces of first and second fixed panes of the window assembly.

3. The window regulator according to claim 1 wherein the drive drum and means for rotating the drive drum are disposed remotely from the guide rail and the first and second inextensible members pass through conduits extending between the guide rail and the drive drum.

4. The window regulator according to claim 1 wherein the drive drum and means for rotating the drive drum are secured to the guide rail.

5. The window regulator according to claim 1 wherein at least one of the inextensible members is a cable.

6. The window regulator according to claim 1 wherein at least one of the guide elements is a pulley.

7. The window regulator according to claim 1 wherein the guide rail comprises a channel enclosing the inextensible members, and the pane carriers slide along an interior of the channel.

8. The window regulator according to claim 1 wherein at least one of the pane carriers comprises a female element for receiving a male element projecting from one of the panes along an axis substantially perpendicular to said one of the panes, whereby relative movement between the at least one of the pane carriers and said one of the panes along the axis of the male element is permitted.

9. A sliding window assembly for a vehicle comprising:

first and second sliding window panes slidable toward one another to a closed position and away from one another to an open position;

first and second pane carriers engaged with the first and second sliding panes respectively for movement therewith;

first and second guide elements disposed outboard of the first and second pane carriers respectively;

a drive drum;

means for rotating the drive drum;

a first flexible, inextensible member having a first end attached to the first pane carrier, extending from the first pane carrier toward and passing around the first guide element, and having a second end engaged with the drive drum;

a second flexible, inextensible member having a first end attached to the second pane carrier and a second end engaged with the drive drum; and a third flexible, inextensible member having a first end attached to the first pane carrier, extending from the first pane carrier toward and passing around the second guide element, and having a second end attached to the second pane carrier;

whereby rotation of the drive drum in a first direction pulls on the first inextensible member to move the first pane carrier toward the first guide element and said movement of the first pane carrier pulls on the third inextensible member to move the second pane carrier toward the second guide element, and rotation of the drive drum in a second direction opposite the first direction pulls on the first end of the second inextensible member to move the second pane carrier toward the first guide element which causes the second pane carrier to pull on the third inextensible member to move the first pane carrier toward the second guide element.

10. The sliding window assembly according to claim 9 further comprising at least one pane attachment secured to at least one of the sliding panes and matable with the pane carrier secured to the at least one of the sliding panes and wherein:

one of the pane carrier of the at least one of the sliding panes and the pane attachment comprises a male element projecting along an axis substantially perpendicular to the at least one of the sliding panes, and the other of the pane carrier of the at least one of the sliding panes and the pane attachment comprises a female element having an opening matching the shape of the male element and engaged with the male element such that relative movement between the pane carrier of the at least one of the sliding panes and the pane attachment along the axis of the male element is permitted.

11. The sliding window assembly according to claim 10 wherein the male element has a non-circular cross-section and the opening of the female element has a shape matching the cross-section of the male element, whereby rotation of the male and female elements relative to one another about the axis is inhibited when the male and female elements are matingly engaged.

12. The sliding window assembly according to claim 9 wherein the pane carriers are slidingly engaged with a guide rail and the guide elements are disposed adjacent outboard ends of the guide rail.

13. The sliding window assembly according to claim 12 further comprising first and second fixed panes and wherein the ends of the guide rail have respective attachment feet for attachment to surfaces of the first and second fixed panes.

14. The sliding window assembly according to claim 12 wherein the guide rail comprises a channel enclosing the inextensible members, and the pane carriers slide along an interior of the channel.

15. The sliding window assembly according to claim 12 wherein the drive drum and means for rotating the drive drum are disposed remotely from the guide rail and the first and second inextensible members pass through conduits extending between the guide rail and the drive drum.

16. The sliding window assembly according to claim 9 wherein at least one of the guide elements is a pulley.

17. The sliding window assembly according to claim 9 wherein at least one of the inextensible members is a cable.

* * * * *